United States Patent [19]
Cesaire et al.

[11] Patent Number: 6,082,615
[45] Date of Patent: Jul. 4, 2000

[54] READER FOR SMART IC CARD

[75] Inventors: Gerard Cesaire, Ris Orangis; François Devaux, Paris; Yves Gerard, Fontenay le Fleury, all of France

[73] Assignee: Syseca S.A., Malakoff, France

[21] Appl. No.: 08/952,497
[22] PCT Filed: May 28, 1996
[86] PCT No.: PCT/FR96/00795
§ 371 Date: Nov. 26, 1997
§ 102(e) Date: Nov. 26, 1997
[87] PCT Pub. No.: WO96/38804
PCT Pub. Date: Dec. 5, 1996

[30] Foreign Application Priority Data

May 30, 1995 [FR] France .................... 95 06369

[51] Int. Cl.[7] ........................................ G06F 17/60
[52] U.S. Cl. ................................. 235/379; 235/380
[58] Field of Search ............................ 235/375, 380, 235/379

[56] References Cited

U.S. PATENT DOCUMENTS 4,727,243   2/1988   Sauar ........................ 235/379

*Primary Examiner*—Harold I. Pitts
*Attorney, Agent, or Firm*—Oblon, Spivak, McClelland, Maier & Neustadt, P.C.

[57] ABSTRACT

A reader for smart IC cards which control the performance of their own transaction. The reader includes devices which alternately generate, for the purpose of being sent to a connected smart IC card, on the one hand, requests for instructions and data and, on the other hand, report messages regarding the execution of instructions received previously from the smart IC card. This reader is not specialized for a specific type of card and is suitable for a variety of IC cards designed for different types of transactions.

4 Claims, 1 Drawing Sheet

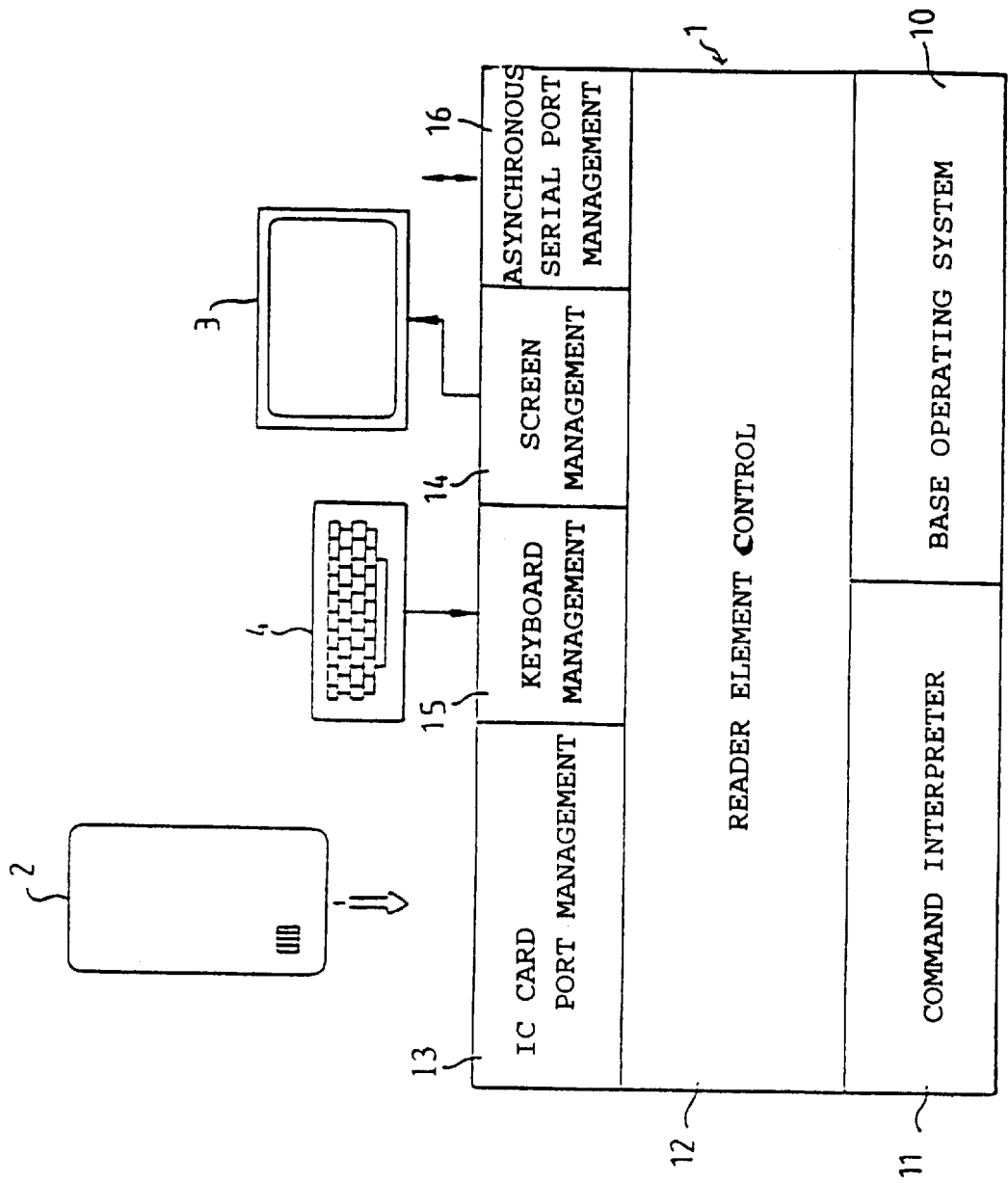

READER FOR SMART IC CARD

BACKGROUND OF THE INVENTION

1. Field of the Invention

The present invention relates generally to a reader for a smart credit card, and more particularly to a reader for various different types of smart credit cards.

2. Discussion of the Background

The term IC card is used to denote cards, generally with the size of a credit card, but alternatively tokens, which are provided with an electronic microcircuit based on memories and a microcontroller designed to make it possible to perform a transaction, for example a financial or medical transaction.

Known IC card readers are provided with a system which provides a link with an IC card, either by means of a multipin electrical connector, or by means of a capacitive or inductive antenna. They are essentially of two types: either self-contained or transparent.

Self-contained IC card readers are ones which work on their own. They have communication elements which are sufficient to allow an individual to monitor and understand the performance of a transaction: keyboard and display which, like the link to the IC card, are managed by the reader's own microcontroller which has a program specific to the transaction in question.

Transparent IC card readers are used for the IC card to access a computer system programmed especially for the transaction in question. For the computer system, they behave as a simple input/output port especially designed for an IC card.

These self-contained or transparent IC card readers use the IC card as a secured-data medium or for the security or encryption functions which it can offer. In all cases, they transmit instructions to the IC card which are set in a form which accords with a specific exchange protocol, often the one defined in standard ISO 7816-3, and manage the response from this card, which they process themselves if they are self-contained, or return to the computer system to which they are connected, if they are transparent.

The intelligence of the transaction therefore lies either in the reader or in the computer system associated with the reader. The drawback of this is the need for specialization of the reader, or the associated computer system, according to the type of transaction. Thus, if the type of transaction needs to be changed, it is not enough to change the programming of the IC card. It is also necessary to change the programming of the reader, if it is self-contained, or the programming of the associated computer system, if the reader is a transparent one. This constitutes an obstacle to the development of IC card applications.

To overcome this drawback, it has been proposed to shift the intelligence, that is to say the management of the transaction, to the IC card itself. However, this is not sufficient if the intention is to keep IC cards compatible with current specialized readers. These IC cards will in fact need to accept the current data exchange protocol. One approach is to provide a plurality of data exchange protocols, but this increases the complexity of the tasks which the smart IC card has to perform, even though its capacity is inherently limited.

SUMMARY OF THE INVENTION

The present invention relates to a smart IC card reader which is not specialized according to transaction type. It also relates to a general-purpose reader for various types of smart IC cards, using a single data exchange protocol which is compatible with the one used by unintelligent IC cards for exchanging data with their specialized readers.

It relates to a smart IC card reader which is noteworthy in that it remains in control of the exchanges of information with a connected smart IC card, which take place on its initiative, while simply having the function of execution in the performance of the transaction, which takes place on the initiative of the IC card. This smart IC card reader has:

means for managing the exchanges of information with a connected smart IC card which alternately and repetitively generate, for the purpose of being sent to the connected smart IC card, on the one hand a request for provision of a packet of instructions and data developed in the said IC card, this being referred to as the "card message" and, on the other hand, a report declaration associated with report messages regarding the execution of instructions previously received in card messages from the said smart IC card, the report declaration and the report message being referred to as the "reader report".

means for receiving and processing the card message delivered by the said smart IC card subsequent to a request for provision of a card message, and means for developing and transmitting reader report messages subsequent to an execution of instructions received from the said smart IC card in card messages.

Advantageously, a card-message provision request coming from the IC card reader consists of a command, of the "get response", type normally used in standards ISO 7816/prEN726 to send prepared data to the reader, while a report declaration coming from the IC card reader consists of a command, of the "envelope" or "execute" type, normally used in standards ISO 7816/prEN726 to send data or have a program executed in an IC card.

BRIEF DESCRIPTION OF THE DRAWINGS

Other characteristics and advantages of the invention will emerge from the following description of an embodiment of the invention, which is given by way of example. This description will be given with reference to the drawing, in which the single FIGURE schematically illustrates the various logic levels of the program of a microcomputer of a general-purpose smart IC card reader according to the invention, with its links to the environment: the IC card, the keyboard and the screen.

DETAILED DESCRIPTION OF THE PREFERRED EMBODIMENTS

This FIGURE shows the broad partitions of the management program of the microcontroller of a reader 1 for a smart IC card 2, this reader being provided with a display screen 3 and a keyboard 4 for control and data entry.

The lowest level of the program is the base operating system 10, in executable code, which is designed for the type of microcontroller used to manage the various elements of the reader 1, and manages the memory of the reader 1. This base operating system 10 is associated with a command interpreter 11 which recognizes the various high-level language instructions which a card message may contain. On top of this combination there is an intermediate level consisting of a control program 12 which oversees the various elements of the reader 1, and an outer level consisting of various peripheral management programs, including a program 13 for managing communication with an IC card according to standard ISO 7816-3, a program 14 for display screen management, a program 15 for keyboard management and a program 16 for a synchronous serial port management for a possible link to a remote computer system. The control program 12 directs the commands originating from the card messages to the command interpreter 11, constructs the report messages intended for the IC card, develops the succession of card-message provision requests and report declarations intended for the IC card, and interfaces with the base operating system and the various peripheral management programs.

The reader 1 communicates with the smart IC card 2 by means of an alternate two-way link, using a succession of cycles of two successive commands from standards ISO 7816/prEN726, namely the "get response" command and the "envelope" or "execute" command.

The "get response" command consists of sending the binary message comprising five successive one-byte fields:
- a first field, denoted "CLA", containing a byte identifying the class of the instruction, for example instructions reserved for financial applications,
- a second field, denoted "INS", containing the byte C0 in hexadecimal, identifying the "get response" command type,
- a third reserved field, denoted "P1", containing the byte 00 in hexadecimal, and
- a fourth reserved field, denoted "P2", containing the byte 00 in hexadecimal, and
- a fifth field, denoted "Le field", containing a byte whose value n corresponds to the number of bytes expected in response from the IC card.

This "get response" command prompts a so-called "Data field" response from the IC card, containing n data bytes, n being the number declared in its "Le field", and two bytes "SW1, SW2", giving a card report.

The "execute" command consists in sending the binary message consisting of five successive one-byte fields and a final multi-byte data field:
- a first field, denoted "CLA", containing a byte identifying the class of the instruction, for example instructions reserved for financial applications,
- a second field, denoted "INS", containing the byte AE in hexadecimal, identifying the "execute" command type,
- a third reserved field, denoted "P1", containing the byte 00 in hexadecimal,
- a fourth reserved field, denoted "P2", containing the byte 00 in hexadecimal,
- a fifth field, denoted "Lc field", containing a byte whose value n corresponds to the number of bytes in the message accompanying the "execute" command, and
- a sixth, final field, denoted "Data field", containing the n data bytes announced in the fifth field "Lc field". This "execute" command prompts a response from the IC card with two bytes "SW1, SW2", giving a card report.

The "envelope" command has the same structure as the "execute" command and differs from it by the value of the byte of its second field "INS" identifying the command which has the value C2 in hexadecimal.

In these three messages, the respective fields "Le field" and "Lc field" declare the length of the expected card message, or the length of the report message from the reader, which are used to carry the instructions to be executed and associated data coming from the IC card and, in return, the reports of the actions executed by the reader, as well as resulting data.

When the smart IC card 2 is inserted into the reader 1, the IC card is detected and powered up by the reader 1, which sends it a reset command according to standard ISO 7816-3. This results in a process of initializing the microcontroller of the smart IC card 2 which ends with an answer to reset being sent to the reader 1 from the smart IC card 2, and with a start-up of the transaction management program of the smart IC card 2 for a first processing cycle which, in this card, leads to the preparation of the first card message which it will be possible to communicate to the reader 1 as soon as the latter has asked for it by means of a message provision request in the form of a "get response" command.

On receipt of the answer to reset, the reader 1 embarks upon a first cycle of data exchange with the smart IC card 2.

During this first exchange cycle, the reader 1 sends the smart IC card 2 a message provision request in the form of a "get response" command, in order to request the sending of the card message prepared by the smart IC card 2 after its initialization.

On receipt of such a request through the "get response" command, the smart IC card 2 sends the prepared card message to the reader 1.

The reader 1 receives the card message, identifies the data which it contains, interprets the message, executes the requested commands and responds o the smart IC card 2 by a report declaration in the form of an "envelope" or "execute" command, with a report message telling the smart IC card 2 how it has performed what was asked of it, and the result of this processing. This completes the first exchange cycle.

On receipt of the "envelope" or "execute" command for the first exchange cycle, coming from the reader 1, the smart IC card 2 continues to run its transaction management program in a second processing cycle, during which it firstly checks for correct execution of the card message which it has just sent, using the report message, then prepares another card message.

The reader 1 then embarks upon a second exchange cycle by sending a second "get response" command to the smart IC card 2 in order to read the new card message. After processing the data of this new card message, the reader 1 reports its execution to the smart IC card 2, by means of a report message incorporated with a second "envelope" or "execute" command, which concludes the second exchange cycle.

On receipt of this second "envelope" or "execute" command coming from the reader 1, the smart IC card 2 then, still under the control of its transaction management program, embarks upon a third processing cycle, during which it checks for correct execution of the card message which it has just sent, by means of the report message received from the reader 1, then prepares another card message.

The reader 1 then embarks upon a third exchange cycle by sending a third "get response" command to the smart IC card 2 in order to receive the card message.

The processing cycles, instigated by the smart IC card 2, and exchange cycles, instigated by the reader 1, thus succeed one another according to the transaction management program stored in the smart IC card 2.

According to standard ISO 7816-3, the reader 1 is in control of the exchanges in electrical terms, but the transaction runs at the instigation of the IC card 2 which is a smart card.

The reader 1 may include several IC card connectors. In this case, only one smart IC card at a time runs the transaction. The smart IC card running the transaction is referred to as "active". The others are referred to as "passive". The first smart IC card capable of answering a "get response" instruction from the reader is the one declared active.

What is claimed is:

1. A reader for interacting with a smart IC card comprising:

means for detecting the insertion of said card;

means for communicating with said card in response to said means for detection;

means for managing exchanges of information through said means for communicating;

said means for managing alternately generating a request for information from said card and sending information to said card;

means for processing information received from said card in response to said request for information, wherein said means for processing receives both data and instructions and acts on the data in accordance with the instructions received from said card; and means for developing a report message in response to said means for processing, said report message being sent to said card through said means for communicating;

wherein said reader is always in control of the exchange of information while the card is in control of the processing so that said reader may be used with different kinds of cards.

2. The reader according to claim 1, wherein said means for processing includes a command interpreter which recognizes instructions received from said card in response to a request for information and executes the instructions.

3. The reader according to claim 1, wherein said means for managing produces a request for information having a digital sequence with a plurality of successive fields, including a command identification field and a field for declaring the length of the requested information.

4. The reader according to claim 1, wherein said means for managing produces a report having a digital sequence with a plurality of successive fields including a command identification field and a field for declaring the length of the associated report.

* * * * *